(12) United States Patent
Lanza

(10) Patent No.: US 9,450,534 B2
(45) Date of Patent: *Sep. 20, 2016

(54) PROTECTIVE COVERING FOR ROOF MOUNTED SYSTEMS

(71) Applicant: Carlo John Lanza, Islip, NY (US)

(72) Inventor: Carlo John Lanza, Islip, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/869,646

(22) Filed: Sep. 29, 2015

(65) Prior Publication Data

US 2016/0087574 A1    Mar. 24, 2016

Related U.S. Application Data

(63) Continuation of application No. 14/525,931, filed on Oct. 28, 2014, now Pat. No. 9,181,705, which is a continuation of application No. 13/673,537, filed on Nov. 9, 2012, now Pat. No. 8,869,470, which is a continuation-in-part of application No. 12/661,379, filed on Mar. 16, 2010, now Pat. No. 8,316,592.

(60) Provisional application No. 61/210,639, filed on Mar. 21, 2009.

(51) Int. Cl.
*E04D 1/36* (2006.01)
*E04D 13/18* (2014.01)
*H02S 20/23* (2014.01)
*E04D 1/30* (2006.01)
*F24J 2/46* (2006.01)
*F24J 2/52* (2006.01)
*E04B 1/41* (2006.01)
(Continued)

(52) U.S. Cl.
CPC ............... *H02S 20/23* (2014.12); *E04B 1/40* (2013.01); *E04B 1/6803* (2013.01); *E04D 1/30* (2013.01); *E04D 13/00* (2013.01); *E04D 13/0481* (2013.01); *E04D 13/14* (2013.01); *E04D 13/1687* (2013.01); *F24J 2/4609* (2013.01); *F24J 2/5247* (2013.01); *E04B 2001/405* (2013.01); *E04D 2001/307* (2013.01); *E04D 2013/0486* (2013.01); *F24J 2002/5294* (2013.01); *Y02B 10/12* (2013.01); *Y02B 10/20* (2013.01); *Y02E 10/47* (2013.01)

(58) Field of Classification Search
CPC ..... E04D 13/00; E04D 13/0481; E04D 1/30; E04D 2013/0486; E04D 2001/307
See application file for complete search history.

(56) References Cited

U.S. PATENT DOCUMENTS

| 853,897 | A | * | 5/1907 | Porter | ............. E04D 13/0481 52/24 |
| 2,307,269 | A | * | 1/1943 | Hauser | ............. E04D 13/1476 285/44 |

(Continued)

FOREIGN PATENT DOCUMENTS

GB    2197359 A  *  5/1988  ............. E04D 1/365

*Primary Examiner* — Elizabeth A Quast
(74) *Attorney, Agent, or Firm* — Alfred M. Walker

(57) ABSTRACT

A protective covering helps to prevent fastener leaks from roof installed fasteners, which are used to mount roofing systems, such as a solar panel installation system, to roofs with a mounting bracket attached to the roof. The protective covering is a portion of flat, malleable waterproof material molded to form a cover, forming a rounded or peaked triangular-shaped structure when viewed from the side. The triangular shaped structure includes a base and a hypotenuse portion where the line of the roof acts as a side which is covered by at least the hypotenuse portion. The hypotenuse portion meets the roof at an angle. The covering is adapted for insertion under portions of a roof shingle, and extends back in a slight rise (downwardly with respect to the roof) to cover the fastener and L-shaped bracket, which the fastener fastens to the roof.

14 Claims, 12 Drawing Sheets

(51) Int. Cl.
*E04D 13/00* (2006.01)
*E04D 13/04* (2006.01)
*E04B 1/68* (2006.01)
*E04D 13/14* (2006.01)
*E04D 13/16* (2006.01)
*E04B 1/38* (2006.01)

(56) References Cited

U.S. PATENT DOCUMENTS

| | | | | |
|---|---|---|---|---|
| 2,490,220 A * | 12/1949 | Freeland | ................ | E04D 13/03 454/366 |
| 4,897,974 A * | 2/1990 | Lane | ................ | E04D 13/1476 285/43 |
| 5,027,576 A * | 7/1991 | Gustavsson | ........ | E04D 13/1475 52/200 |
| 5,328,212 A * | 7/1994 | Kosik, Jr. | ........... | E04D 13/1476 285/208 |
| 6,183,360 B1 * | 2/2001 | Luter, II | .................... | F24F 7/02 454/366 |
| 6,412,229 B2 * | 7/2002 | Kuhns | ................ | E04D 13/076 52/11 |
| 6,691,469 B2 * | 2/2004 | Miller | ................ | E04D 13/1476 285/42 |
| 7,730,681 B2 * | 6/2010 | Gilleran | ............... | E04F 13/0869 52/219 |
| 7,997,032 B2 * | 8/2011 | Riley | .................... | E04D 13/10 52/18 |
| D678,996 S * | 3/2013 | Jones | ........................ | D23/393 |
| 8,448,405 B2 * | 5/2013 | Schaefer | .................. | E04C 3/06 52/60 |
| 8,448,407 B1 * | 5/2013 | Wiener | ................ | F16B 5/0275 126/623 |
| 8,453,389 B2 * | 6/2013 | Selke | ................ | E04D 13/1476 52/58 |
| 8,713,858 B1 * | 5/2014 | Xie | ........................ | H02S 20/23 52/58 |
| 2008/0190047 A1 * | 8/2008 | Allen | .................... | H02S 20/23 52/173.3 |
| 2010/0242381 A1 * | 9/2010 | Jenkins | ............... | H01L 31/0482 52/173.3 |
| 2011/0314751 A1 * | 12/2011 | Jette | ........................ | F24J 2/523 52/173.3 |
| 2012/0031019 A1 * | 2/2012 | Stearns | .................. | E04D 13/10 52/173.3 |
| 2012/0031024 A1 * | 2/2012 | Selke | ................ | E04D 13/1476 52/219 |
| 2013/0161457 A1 * | 6/2013 | Klinga | ............... | H01L 31/0424 248/201 |

* cited by examiner

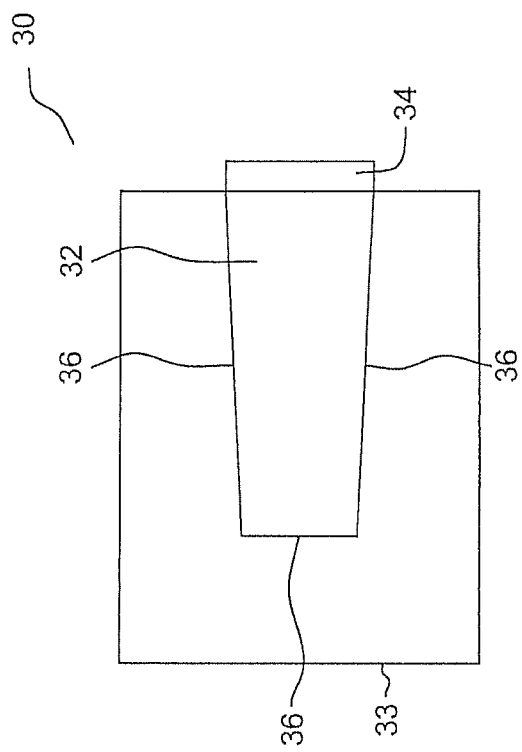
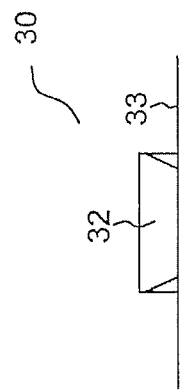
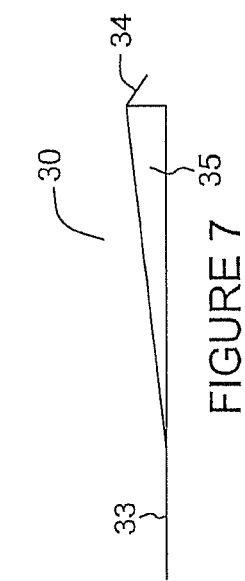

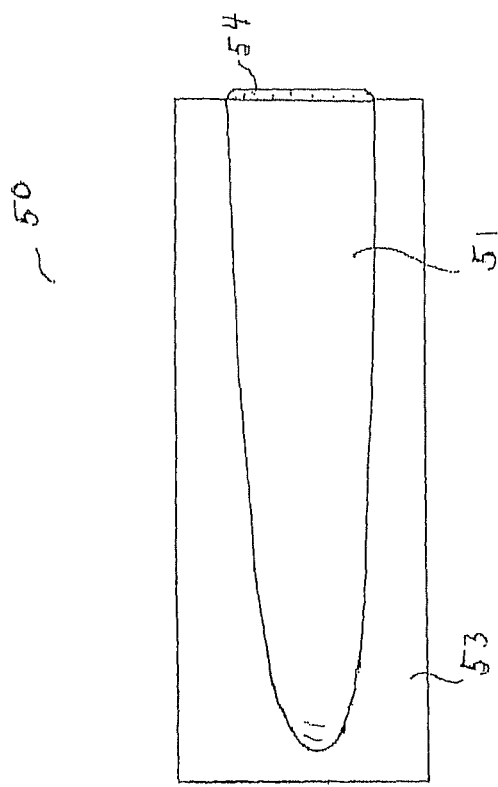
FIGURE 13
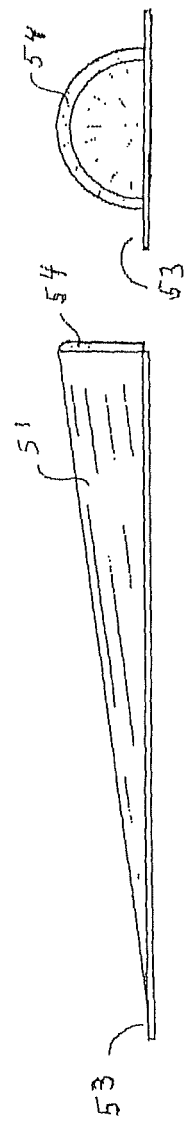
FIGURE 14
FIGURE 15

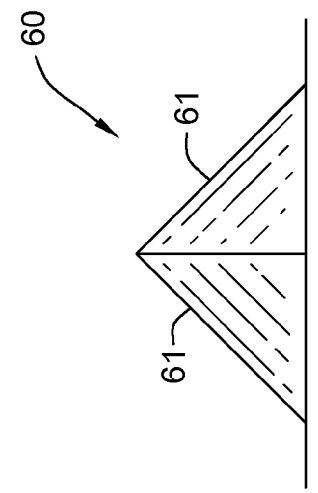
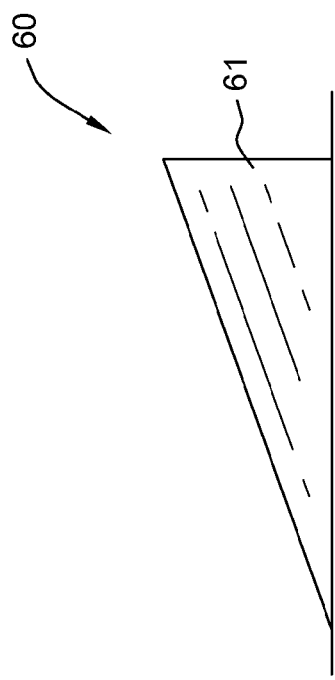
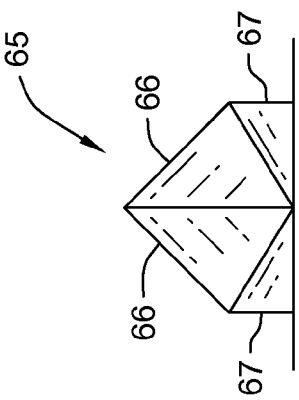
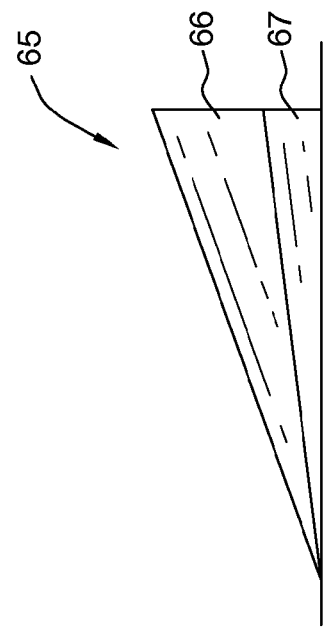

PROTECTIVE COVERING FOR ROOF MOUNTED SYSTEMS

RELATED APPLICATIONS

This application is a continuation of application Ser. No. 14/525,931 filed on Oct. 28, 2014, which '931 application is a continuation of application Ser. No. 13/673,537, filed Nov. 9, 2012, which '537 application is a continuation-in-part of application Ser. No. 12/661,379, filed Mar. 16, 2010, and Applicant claims priority in part pursuant to 35 USC §120. Application Ser. No. 12/661,379 is based upon Provisional Application Ser. No. 61/210,639, filed Mar. 21, 2009, and which application Ser. No. 12/661,379 claimed priority and benefit therefrom under 35 U.S.C. §119(e). These applications are incorporated by reference herein.

FIELD OF THE INVENTION

This application relates to protective covers for roof mounted systems which help prevent water entry.

BACKGROUND OF THE INVENTION

This invention broadly relates to residential roof mounted systems and, more particularly relates to a protective covering for helping to prevent water entry to structure-underlying roof locations at which the particular roof systems are fastened.

Various roof mounted systems are known. Examples without limitation include roof-mounted satellite antenna systems, roof-mounted solar water-heating systems, roof-mounted air cooling systems and roof-mounted solar panel systems, for example, photovoltaic mounting systems, sometimes referred to as photovoltaic (PV) racking systems. It is also known that building codes require securing PV racking systems securely to a pitched roof's underlying structural members, further requiring that multiple lag screws or through bolts penetrate the roofing material and sheathing in order to secure the PV racking system. Each associated hole is a potential entry point for water into the underlying structure for the entire life of the mounted PV racking system.

One common way of for securing roof-mounted appara-tus', such as PV racking systems, to a roof is to mount the bracket to the roof at one end, by using a fastener such as an exposed lag screw or bolt, and attaching the bracket at its other end, or by attaching to an attaching point to the PV racking system. Brackets come in many shapes and sizes, for example, in a form of an L-bracket. While mounting a roof system with a bracket, such as an L-bracket, will generally include sealing the area around the exposed lag screw with a sealant such as waterproof caulking, such seals do not readily last for the life of the roof mounted system, and once installed and attached at the bracket, the roof mounted system will normally prevent access to reseal the mounting hole.

SUMMARY OF THE INVENTION

The present invention was developed to overcome the sealing difficulties of prior art roof mounting systems, such as, for example, solar panel installations, requiring roof fastener penetrations.

The invention comprises a novel protective cover over the roof for covering a fastener and part of an L-shaped bracket utilized on a roof, particularly a slanted roof, for securing a roof mounted system. The cover comprises a sheet of metal, or other malleable of molded material, formed as a triangular member, the narrow end of which may be inserted under a portion of a roofing shingle, and the rear end of which extends over the normally exposed fastener and part of an L-shaped bracket attaching the solar panel installation to the roof. The protective covering is a portion of flat, malleable waterproof material molded to form a cover preferably forming a triangular-shaped structure when viewed from the side. The triangular shaped structure includes a base and a hypotenuse where the line of the roof acts as a side which is covered by at least the hypotenuse, with the hypotenuse of the triangular structure meeting the roof at an angle. The triangular structure is adapted for insertion under a portion of a roof shingle, and extending back in a slight rise (downwardly with respect to the roof) to cover the exposed fastener and L-shaped bracket which the fastener fastens to the roof. An alternative embodiment of the cover may include tabs at all end portions.

Protective covers of this invention in further alternate embodiments are formed with a variety of tapered covering member shapes besides flat, including curved non-sloping or sloping rounded tapered structures as well as peaked tapered structures.

The covers are installed and attached to brackets which are covered but for the part fastened to a rack frame for a solar panel installation.

Alternatively the covers may be installed, without any roof mounting system.

The cover covers the exposed L-bracket affixed to a portion of a roof via an exposed fastener. The cover may be maintained in place by sliding up under portions of the roofing shingles, and/or with an adhesive or sealant, e.g., silicone caulking. The cover should operate to help to prevent water seepage into the fastener opening as long as it remains fixed in place, regardless of the longevity of the sealant/adhesive.

BRIEF DESCRIPTION OF THE DRAWINGS

The present invention can best be understood in connection with the accompanying drawings. It is noted that the invention is not limited to the precise embodiments shown in drawings, in which:

FIG. 6 is a top view of an alternate embodiment of cover of this invention with a full flashing flange on all three sides, including the front edge.

FIG. 7 is a side elevation of the alternate embodiment.

FIG. 8 is a front elevation of the alternate embodiment.

FIG. 13 is a top plan view of another alternate embodiment cover with a sloping side and a rounded contour.

FIG. 14 is a side elevation showing the sloping configuration of the embodiment of FIG. 13.

FIG. 15 is an open end view showing the interior of the embodiment shown in FIG. 13.

FIG. 17 is a side elevation of a cover shape of yet another embodiment of this invention with a peaked sloping shape formed of two triangles.

FIG. 18 is an open end view of the cover shape of FIG. 17 showing the interior.

FIG. 19 is a side elevation of another sloping peaked cover shape embodiment, but with vertical sides.

FIG. 20 is an open end view of the cover shape of FIG. 19 showing the interior.

DETAILED DESCRIPTION OF THE DRAWINGS

Figure 1:
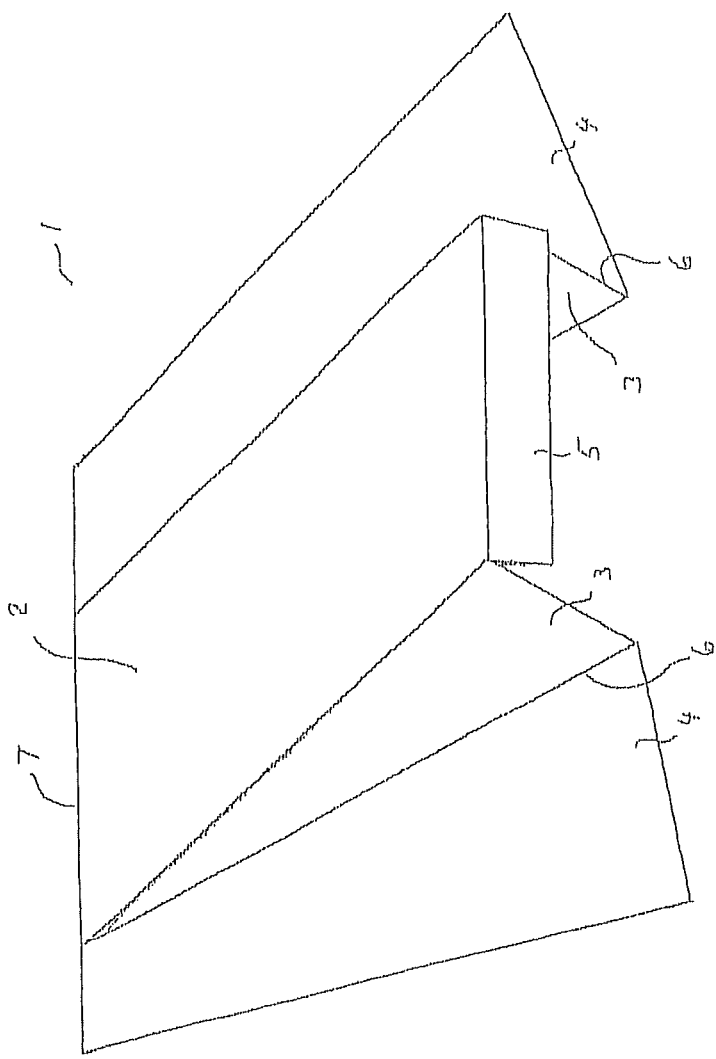
FIG. 1 is a perspective view of the cover of this invention.

FIG. 1 shows a protective cover 1 of this invention. Although many material choices and fabrication techniques are possible such as a variety of molded plastic materials, sheet metal (such as aluminum or copper) cut and folded or punch pressed into shape are preferred. Sloped surface 2 is supported by triangular sides 3. Flanges 4 on each side are designed to be fitted underneath the top and side portions of a shingle, which is cut to fit the contour of surface 2. Optional back edge 5 forms a drip edge and further shields the roof fastener. Edges 6 at the intersection of sides 3 and flanges 4 as well as the front edge 7 are preferably sealed against the shingle with appropriate sealant.

Figure 2:
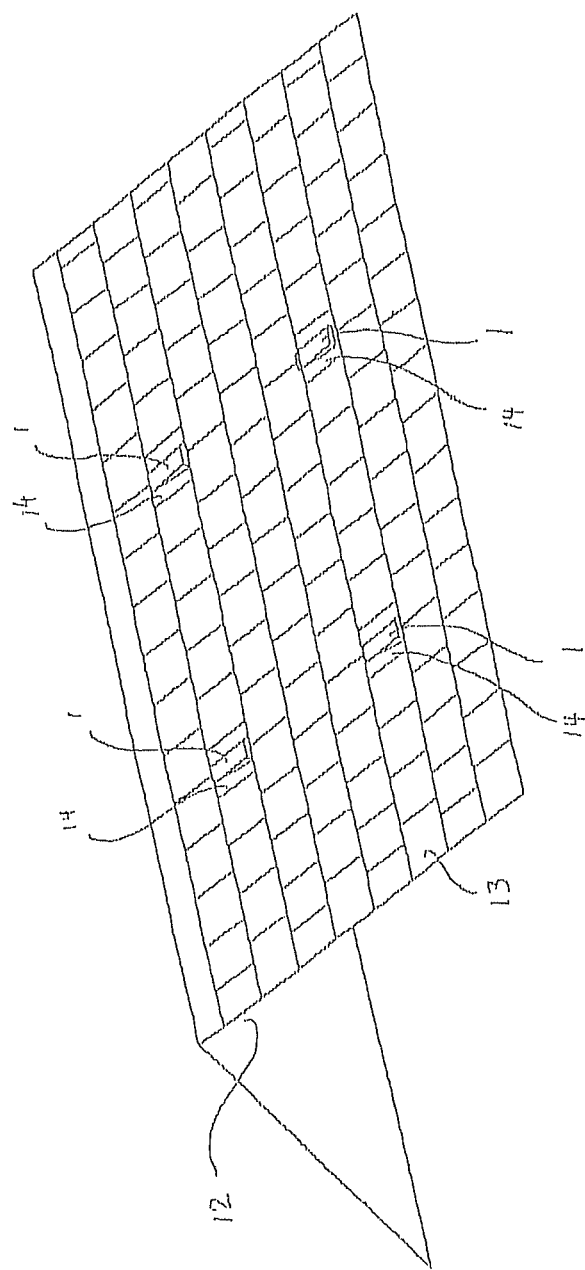
FIG. 2 is a perspective view of a pitched shingled roof with four of the covers of FIG. 1 spaced apart and installed over brackets for attachment to a solar collector.

FIG. 2 shows the placement of four covers 1 over mounting brackets for a solar collector on pitched roof 12. Note that the top layer of shingles 13 are cut around each cover 1 at the mounting sites 14.

Figure 3:
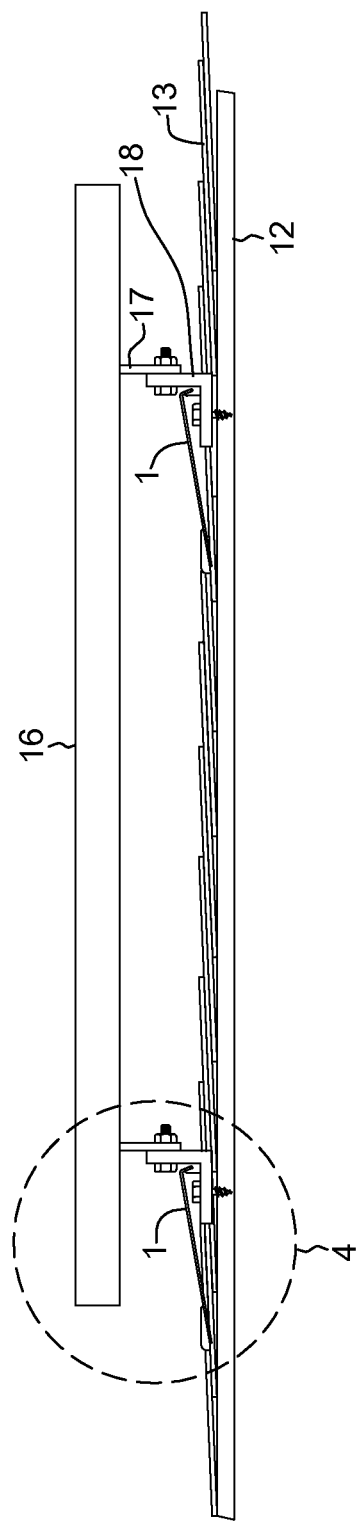
FIG. 3 is a side view showing the covers of FIG. 1 installed on a shingled roof as part of the attachment hardware of a solar collector.

FIG. 3 shows a side view of solar panel 16 mounted on roof 12 over shingles 13.

Figure 4:
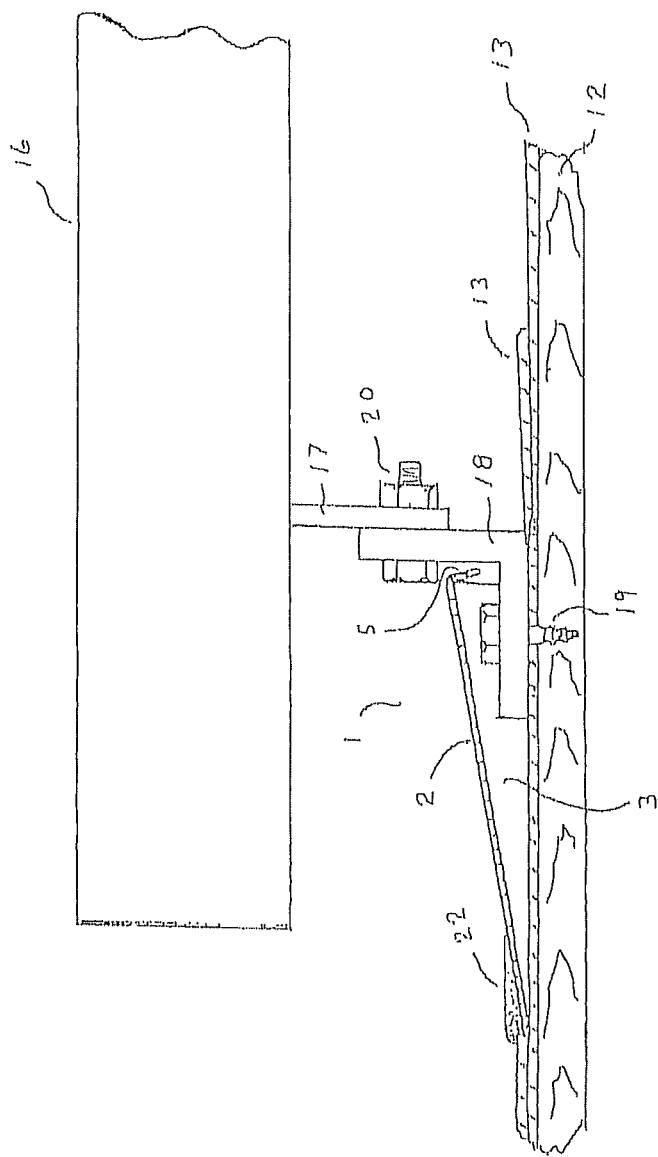
FIG. 4 is an enlarged side view detail of the cover of FIG. 1 (shown in crossection) protecting the bracket fastener installation of a solar collector.

The fastener area is enlarged in the detail shown in FIG. 4. L-bracket 18 is attached by lag bolt 19 to roof 12. Collector mounting bar 17 is attached via fastener 20 to bracket 18. Cover 1 (shown in crossection) covers the head of normally exposed fastener 19 which is now covered under sloped section 2. A small portion of sealant 22 is seen at the front end of cover 1.

Figure 5:
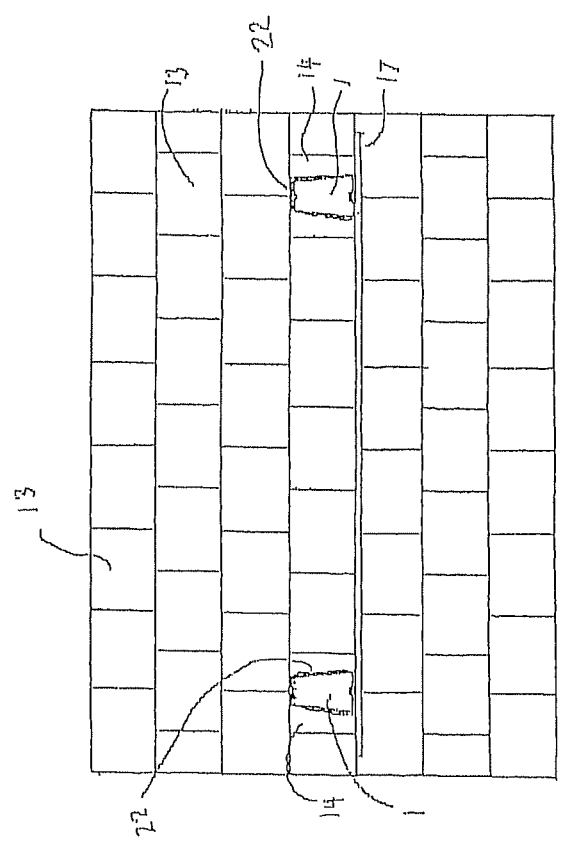
FIG. 5 is a detail top view of two covers installed on a shingled roof showing the use of sealant on three sides. (The solar collector is not shown in this view for clarity, although the fastening strip of the collector is shown).

FIG. 5 shows a section of roof with two covers 1 installed inside the cut-away contour of top shingles 14 and sealed with a bead of sealant 22 on the front edge and both sides.

FIGS. 6-8 show a top side and front view respectively of an alternate embodiment of cover 30 of this invention. This cover has a continuous flashing flange 33 that surrounds the sloping area 32 on all three sides including the front. Optional back drip edge 34 serves the same function as edge 5 of cover 1. Contour 36, which is located at the interface of front of section 32 and sides 35 with flange 33; defines the location of sealant bead that would be applied to seal cover 30 with shingled surfaces.

FIGS. 9-20 show several embodiments of covers of this invention with alternative shapes besides the flat sloping cover of the embodiments above. An optional rear drip edge can be appended to the rear of any of these embodiments.

Figure 9:
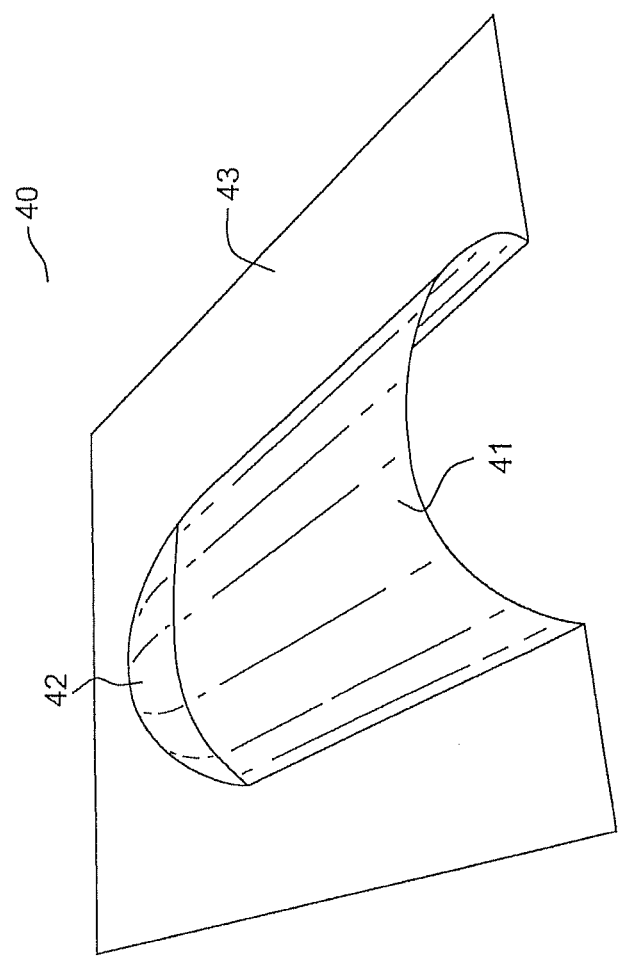
FIG. 9 is a perspective view of an alternate embodiment cover with a domed front and an axially truncated rounded cylinder.
Figure 10:
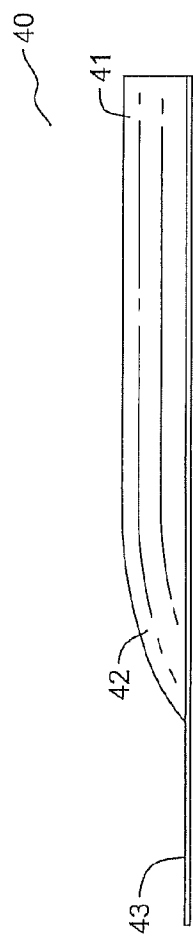
FIG. 10 is a side elevation of the embodiment of FIG. 9.
Figure 11:
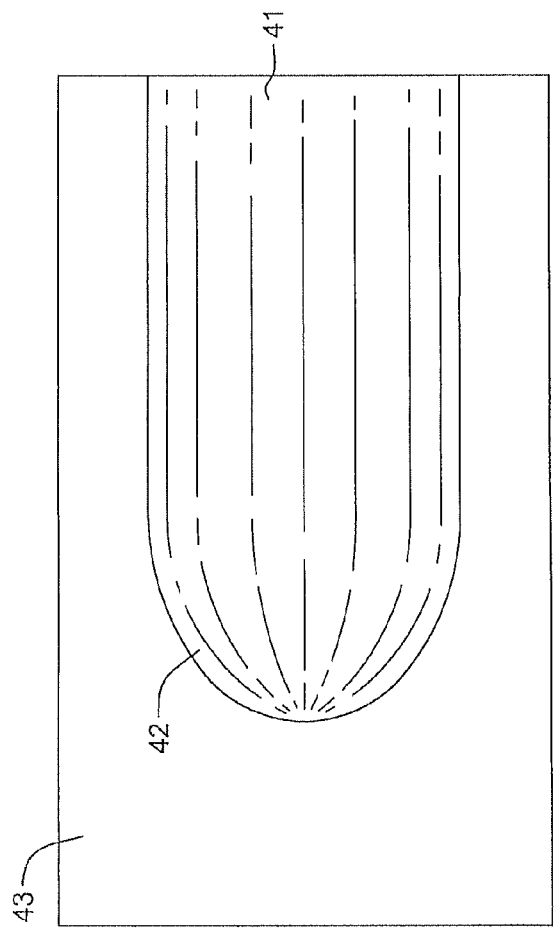
FIG. 11 is a top plan view of the embodiment of FIG. 9.
Figure 12:
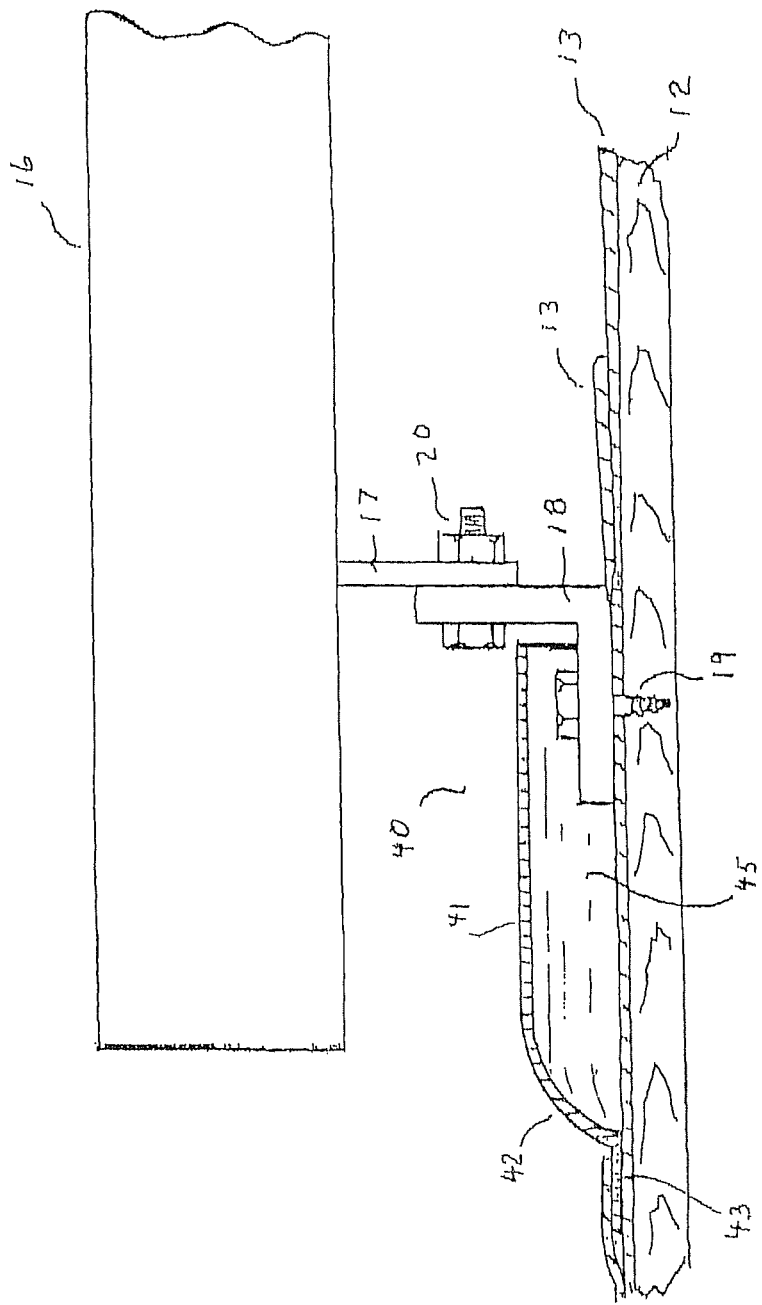
FIG. 12 is a side view detail of the cover of FIG. 9 (shown in crossection) protecting the bracket fastener installation of a solar collector.

The embodiment 40 of FIGS. 9-12 is best understood in geometric terms as a curved hollow cylinder of circular or oval crossection tapered with a domed front as truncated by a plane parallel to the cylinder axis. FIG. 9 shows a perspective view while FIGS. 10 and 11 show a side elevation and a top view respectively. A flange 43 is shown around three edges of the cover. Dome closed end 42 and cylindrical cover 41 complete the embodiment. FIG. 12 shows a detail of an installation with cover 40 shown in crossection. The interior 45 is shown in a side view.

Figure 16:
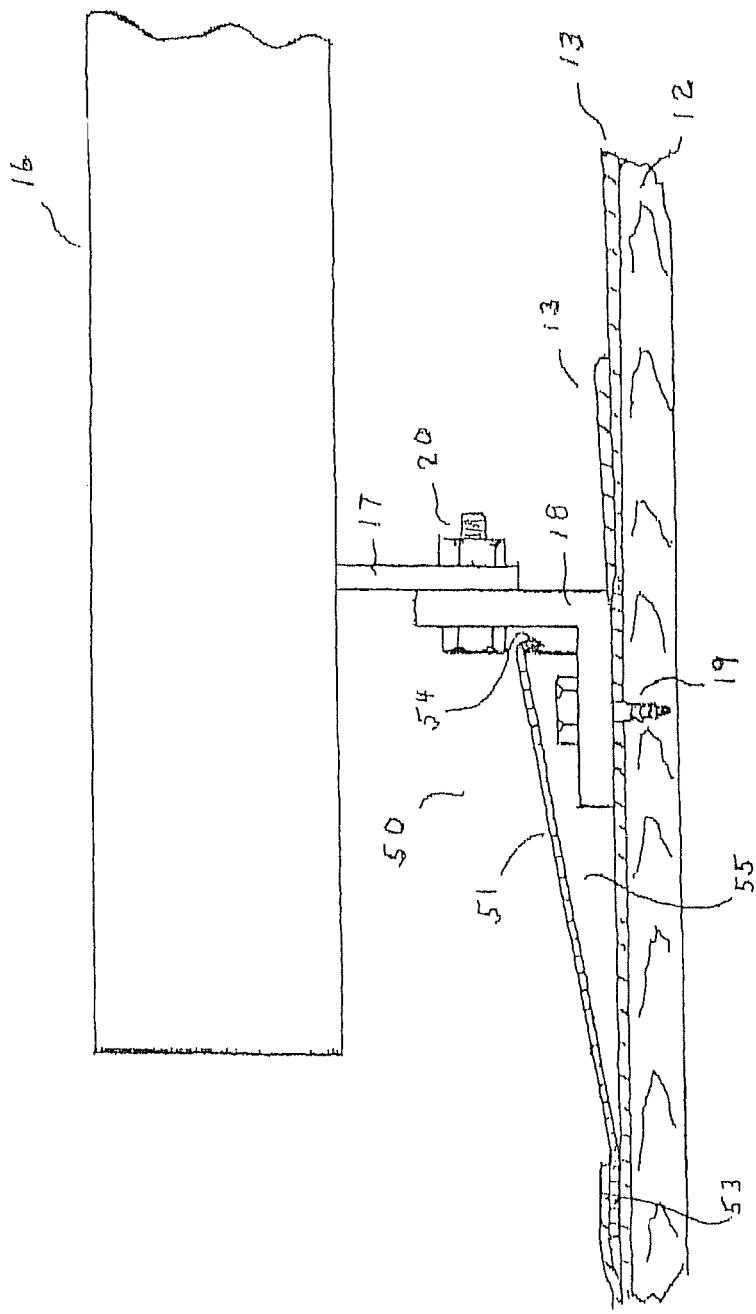
FIG. 16 is a side view detail of the cover of FIG. 13 (shown in crossection) protecting the bracket fastener installation of a solar collector.

FIGS. 13-16 show cover embodiment 50 in various views. The geometry here is best described as a curved hollow tapered cylinder of round or oval crossection as truncated by a plane angled to the axis and piercing the end at median and a side. The round contour 51 is shown surrounded at three edges by flange 53. An optional drip edge 54 is also shown at the rear. FIG. 16 shows the details of an installation with cover 50 shown in crossection. The sloping contoured interior 55 is shown in this view.

Other cover shape embodiments with sloping peaked shapes are shown in FIGS. 17-20. Shape 60 (FIGS. 17-18) has two triangular sides 61 joined at a central peak. Shape 65 is similar to 60 having a central peak and sloping tapered down toward the front, however it has vertical sides 67 below sloping triangular roof members 66 joined at the peak. Other variations such as a gambrel roof with a symmetrical two-sided shape having two slopes on each side. The upper slope is positioned at a shallow angle, while the lower slope is steep. An arched roof with straight vertical sides is also possible.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

I claim:

1. A protective covering for, and in combination with, a roof-mounted system that is attached with a mounting bracket attached to a sloping roof using at least one fastening member, comprising:

a fastening member penetrating a shingle and underlining structure of said roof for attaching said mounting bracket to said roof;

said roof-mounted system supported and spaced from said roof by a mounting member connected to said mounting bracket and said roof-mounted system;

a portion of at least one shingle being cut away to accommodate said mounting bracket mounted on said roof;

a protective cover for enclosing said fastening member and at least a portion of said mounting bracket for preventing fastening leaks of water through said roof;

said protective cover comprising malleable waterproof material forming a top surface extending from a flashing flange base of said protective cover to a distal end of said protective cover and having side walls, said top surface having an open end forming an open archway having vertical edges extending from said flashing flange base and spanning over said open end, said top surface extending lengthwise away from said open archway and converging to an opposite tapered end;

said flashing flange base of said protective cover extending under a distal end of another shingle, said top surface extending out from said flashing flange base in a slight rise, downwardly with respect to the roof to form said side walls, said distal end of said protective cover covering the fastener and said portion of said mounting bracket which the fastener fastens to the roof.

2. The combination of claim 1 in which said mounting bracket is L-shaped, with said fastener extending through one leg of said L-shaped mounting bracket into an underlying roof structure.

3. The combination of claim 2 in which said roof-mounted system comprises a photovoltaic PV racking system.

4. The combination of claim 1 in which said protected cover has a flap extending down from a distal edge of said protective cover forming a drip edge for providing further shielding of said fastener.

5. The combination of claim 1 in which said top surface extends lengthwise in a horizontal axis away from said open archway of said protective cover, said opposite end of said protective cover being truncated by a plane parallel to a horizontal axis and a pair of flanges extending out from bottom edges of said protective cover.

6. The combination of claim 1 having sealant on said distal end of the shingle.

7. The combination of claim 1 in which multiple mounting brackets are mounted on more than one shingle to support said roof-mounted system.

8. The combination of claim 1 in which said fastener is a lag bolt.

9. The combination of claim 1 in which said protective cover is of one piece construction.

10. The combination of claim 1 in which said roof-mounted system comprising a solar panel.

11. The combination of claim 1 in which said side walls of said protective cover are tapered-shaped side walls.

12. The combination of claim 11 in which said top surface is a peaked top surface comprising said tapered-shaped side walls extending down from said peaked top surface with an apex of each tapered-shaped side wall extending down from said peaked top surface.

13. The combination of claim 1 in which said top surface comprises a gambrel roof shape with a symmetrical two-sided shape having two slopes on each side.

14. The combination of claim 1 in which said top surface comprises an arched roof with straight vertical sides.

* * * * *